UNITED STATES PATENT OFFICE.

FREDERICK W. HUBER AND FRANK F. REATH, OF RIVERSIDE, CALIFORNIA, ASSIGNORS TO WILLIAM G. HENSHAW, OF SAN FRANCISCO, CALIFORNIA.

LEACHING FLUE-DUST.

1,220,989.   Specification of Letters Patent.   Patented Mar. 27, 1917.

No Drawing.    Application filed December 2, 1916. Serial No. 134,708.

*To all whom it may concern:*

Be it known that we, FREDERICK W. HUBER and FRANK F. REATH, both citizens of the United States, residing at Riverside, in the county of Riverside and State of California, have invented certain new and useful Improvements in Leaching Flue-Dust, of which the following is a specification.

The present invention relates to an improved process of extracting from the flue dust of cement-making substantially the entire amount of potassium, in the form of soluble potassium salts. While the process is applicable to flue dust produced by various processes of calcination and separation, it has been found to be especially advantageous in the case of that flue dust produced by electrical precipitation methods, and particularly that flue dust which contains, in addition to cement dust, and unclinkered cement-making material, considerable quantities of potassium and calcium sulfates. Such dust consists largely of cement, potassium compounds, calcium sulfate, unclinkered raw materials, etc.

A large number of processes have been suggested, some of which have been patented, for producing cement and potassium compounds, in which feldspathic rocks are calcined with calcareous materials, sometimes in the presence of haloid compounds, and the method which, up to the present time, has given the most satisfactory results, so far as we have been advised, is the method involving the treatment of the dust laden exit gases by electrical precipitation, such as the ordinary Cottrell system. The present invention is found to be particularly suitable for use in connection with the dust so treated. While this dust from the Cottrell separator contains a materially higher percentage of potassium compounds than does the raw material from which it has been produced, it also contains considerable amounts of other salts, and in many cases this material is found not to contain sufficient potassium compounds for direct use as potassium salts in the various arts. Accordingly it is very advisable to concentrate this material, to produce therefrom, a solution of a potassium salt or potassium salts, and an insoluble or substantially insoluble residue, containing none or only a little of the potassium content of the dust. It has been proposed to accomplish this purpose by merely leaching the flue dust, with cold or warm water, and after filtration concentrating the resulting solution. Such a process, however, we have found to deliver only a relatively small quantity of the potassium salts present in the dust, a large proportion of such salts remaining in the leached residue, or in the filter press cakes. The processes ordinarily employed for leaching do not extract more than about 50% of the potassium content of the flue dust, in a water-soluble form. Even after washing, the filter cake retains as much as 50%, or even more than this, of the total amount of the potassium salts originally present.

We have carefully investigated the reasons for the nonsolution of the potassium compounds by water, and our experiments have led us to believe that the poor extraction is due to the formation of a double sulfate having the formula $CaSO_4K_2SO_4H_2O$ which is not readily soluble in water at temperatures below about 85° C. This salt may be formed in the solution, or on, or in the body of insoluble material contained in the flue dust. We have further found that by proper procedure herein described, we can to a very large measure prevent the retention of such large quantities of the potassium content of the flue dust in the insoluble material thereof.

In carrying out our process, we add water to the flue dust, so as to produce a mixture having a temperature of nearly 100° C., in any event above 85° C. We then agitate the mixture thoroughly while maintaining this temperature, then filter the material while still maintaining the same temperature, then wash the filter cake while still maintaining the same temperature.

We prefer to charge into an agitated tank, such an amount of the flue dust and water as will produce a solution in hot water, having a temperature above 85° C. (preferably above 90° C.) of all the soluble potassium salts present, said solution containing not less than 4%, nor more than 5% of $K_2O$ (equivalent to about 9 to 10% of $K_2SO_4$). The material is then agitated, while the temperature is maintained between 90 and 100° C., and the agitation continued until the potassium content of the solution reaches a maximum. The solution, together with the insoluble material carried thereby, is then led to filters or filter presses, is filtered while still maintaining this temperature, the insoluble material is washed with hot water having a temperature not below 85° C.

In this manner we are able to prevent the precipitation of the insoluble potassium-calcium sulfate, which would occur if the liquor were at a temperature below about 85° C. Experiments indicate that the said compound, if the liquor is kept above 85° C. (or more perfectly at above 90° C.) is decomposed with the production of insoluble $CaSO_4$ and a solution of $K_2SO_4$, but that below this temperature said two substances recombine to produce the insoluble double salt. The relative speed of these two reactions at a given temperature will depend to a certain extent on the factors such as concentration, relative amounts of potassium and calcium compounds present, and perhaps other things, but we desire in all cases to maintain a sufficiently high temperature to prevent the formation of the insoluble double sulfate, and consequent retention of potassium compounds by the said precipitate.

The filtrate is thereafter concentrated in any convenient manner and the soluble potassium salts obtained thereby.

While we have described the process in great detail, we desire to state that we do not limit our invention to all the details above stated, but only to the scope of the appended claims.

What we claim is:

1. A process of obtaining potassium salts from flue dust containing the same, and containing the sulfate radical which consists in subjecting the said dust to the action of water, and removing the liquid from the undissolved solids, both stages being effected at a temperature not below about 85° C.

2. A process of obtaining potassium salts from sulfate containing flue dust containing hot water soluble potassium compounds, which consists in agitating the said dust with water, and removing the liquid from the undissolved solids, both stages being effected at a temperature approaching 100° C.

3. A process which comprises treating flue dust containing potassium compounds and insoluble matter of the general character of hydraulic cement, said dust comprising potassium sulfate and calcium sulfate, by subjecting the said dust to the action of water and removing the liquid from the undissolved solids, both these operations being performed at a temperature not below about 85° C.

4. The herein described process of treating sulfate containing cement flue dust, which comprises subjecting the same to the action of water in such proportions as to produce a solution of about 4 to 5% of $K_2O$, in the form of soluble salts, while at a temperature sufficiently high to prevent the formation of the insoluble double salt $CaSO_4.K_2SO_4.H_2O$.

5. In the extraction of flue dust, the treatment thereof with water, maintained at a temperature not below 85° C., in such relative proportions as to produce a solution containing potassium salts equivalent to 4 to 5% $K_2O$.

6. The process which comprises subjecting electrically precipitated cement flue dust containing calcium and potassium at least a portion thereof existing in the condition of sulfates, which comprises subjecting the same to water maintained at a temperature at which the relatively insoluble compound $CaSO_4.K_2SO_4.H_2O$ is unstable.

7. The process which comprises subjecting electrically precipitated cement flue dust containing calcium and potassium at least a portion thereof existing in the condition of sulfates, which comprises subjecting the same to water maintained at a temperature at which the relatively insoluble compound $CaSO_4.K_2SO_4.H_2O$ is unstable, and thereafter separating the liquid from the insoluble solids while at said temperature.

In testimony whereof we affix our signatures.

FREDERICK W. HUBER.
FRANK F. REATH.